(12) United States Patent 
Peari et al.

(10) Patent No.: US 7,963,849 B2
(45) Date of Patent: Jun. 21, 2011

(54) INPUT ARRANGEMENT FOR VIDEO GAME TERMINAL

(75) Inventors: Genadi Peari, Richmond Hill (CA); Boris Itskov, Thornhill (CA); Roman Brik, North York (CA)

(73) Assignee: JVL Corporation, Concord, ON (CA)

( * ) Notice: Subject to any disclaimer, the term of this patent is extended or adjusted under 35 U.S.C. 154(b) by 1316 days.

(21) Appl. No.: 11/519,906

(22) Filed: Sep. 13, 2006

(65) Prior Publication Data

US 2008/0076568 A1  Mar. 27, 2008

(51) Int. Cl.
*G06F 17/00* (2006.01)

(52) U.S. Cl. ........................................ 463/36

(58) Field of Classification Search .............. 463/36–38; 345/161
See application file for complete search history.

(56) References Cited

U.S. PATENT DOCUMENTS

| | | | |
|---|---|---|---|
| 7,106,305 B2 * | 9/2006 | Rosenberg | 345/168 |
| 7,605,800 B2 * | 10/2009 | Rosenberg | 345/156 |
| 2001/0046896 A1 * | 11/2001 | Miyamoto et al. | 463/31 |
| 2002/0115486 A1 * | 8/2002 | Miyamoto et al. | 463/32 |
| 2005/0277470 A1 * | 12/2005 | Watanachote | 463/37 |

* cited by examiner

*Primary Examiner* — Ronald Laneau

(57) ABSTRACT

A durable input arrangement for a video game terminal uses a joystick controller protected by a player actuating a control assembly. This assembly protects the joystick controller from abusive forces that would otherwise render the controller inoperative.

7 Claims, 12 Drawing Sheets

INPUT ARRANGEMENT FOR VIDEO GAME TERMINAL

FIELD OF THE INVENTION

The present invention relates to video game terminals, and in particular, to a control actuating arrangement that uses a slide actuating arrangement.

BACKGROUND OF THE INVENTION

Video game terminals for the amusement market now commonly use a touch screen as a user interface. Touch screens allow a player to interact with a game by touching various active areas on the screen, in response to different game situations. This type of user interface is effective for many games, however, some games are more suited to a joystick type controller for providing game input instructions. There are many different joystick controllers from miniature joystick controllers used for personal computers to large handle grip type controllers used in video game terminals. Unfortunately, both large joystick controllers used in video games and miniature joystick controllers are subject to damage and have not proven suitable for many video game terminals.

In particular, video game terminals that are commonly provided in restaurants or licensed beverage establishments are subject to substantial abuse and are effectively unattended. The touch screen input has proven to be suitable for this type of environment, however, other user input devices such as track balls and joysticks have proven unacceptable due to the rough handling that occurs in an unattended and often abusive environment.

The present invention utilizes a joystick controller in combination with a control actuating arrangement that serves to protect the joystick controller to provide a rugged user interface required for this unattended environment.

SUMMARY OF THE INVENTION

The present invention is directed to video game terminals having a particular control actuating arrangement. The control actuating arrangement comprises a miniature joystick controller mounted on a support member, a support collar mounted on a support member with a shaft actuator of a joystick controller exposed within the collar. A player actuated control arrangement is supported by said collar above said joystick controller and engages an end of a control shaft of the joystick controller and causes pivoting movement of the control shaft in response to lateral movement of the player actuator control. The player actuator control assembly is movable laterally through 360 degrees to allow player input to the joystick controller.

In a preferred aspect of the invention, the player actuator control arrangement includes a top surface comprised to receive in a side by side manner, two or more fingers of a player to reflect player input to the joystick controller via lateral movement of the player actuator control assembly.

In a further aspect of the invention, the player actuator control assembly is oversized relative to the joystick controller and protects the joystick controller from abusive forces.

In a further aspect of the invention, the player actuator covers the joystick controller and directs any liquid poured on the player actuator control assembly past the joystick controller.

In a further aspect of the invention, the joystick controller includes a button actuator controlled by downward means of a control shaft and the player actuator control assembly accommodates limited downward movement to actuate the button actuator of the joystick controller.

In a further aspect of the invention, the joystick controller includes an upwardly directive light source and the player actuator control assembly includes a translucent portion through which emitted light of the light source is transmitted.

In yet a further aspect of the invention, the light source is actuated for any games where the control actuator is activated.

BRIEF DESCRIPTION OF THE DRAWINGS

Preferred embodiments of the invention are shown in the drawings, wherein:

FIG. 5b is a partial cross sectional view of an actuating button associated with the control actuating arrangement;

FIG. 5c is a cross sectional view through the control actuating arrangement, including the joystick controller;

FIG. 5d is a partial cross sectional view through a further button actuator;

DETAILED DESCRIPTION OF THE PREFERRED EMBODIMENTS

Figure 1:
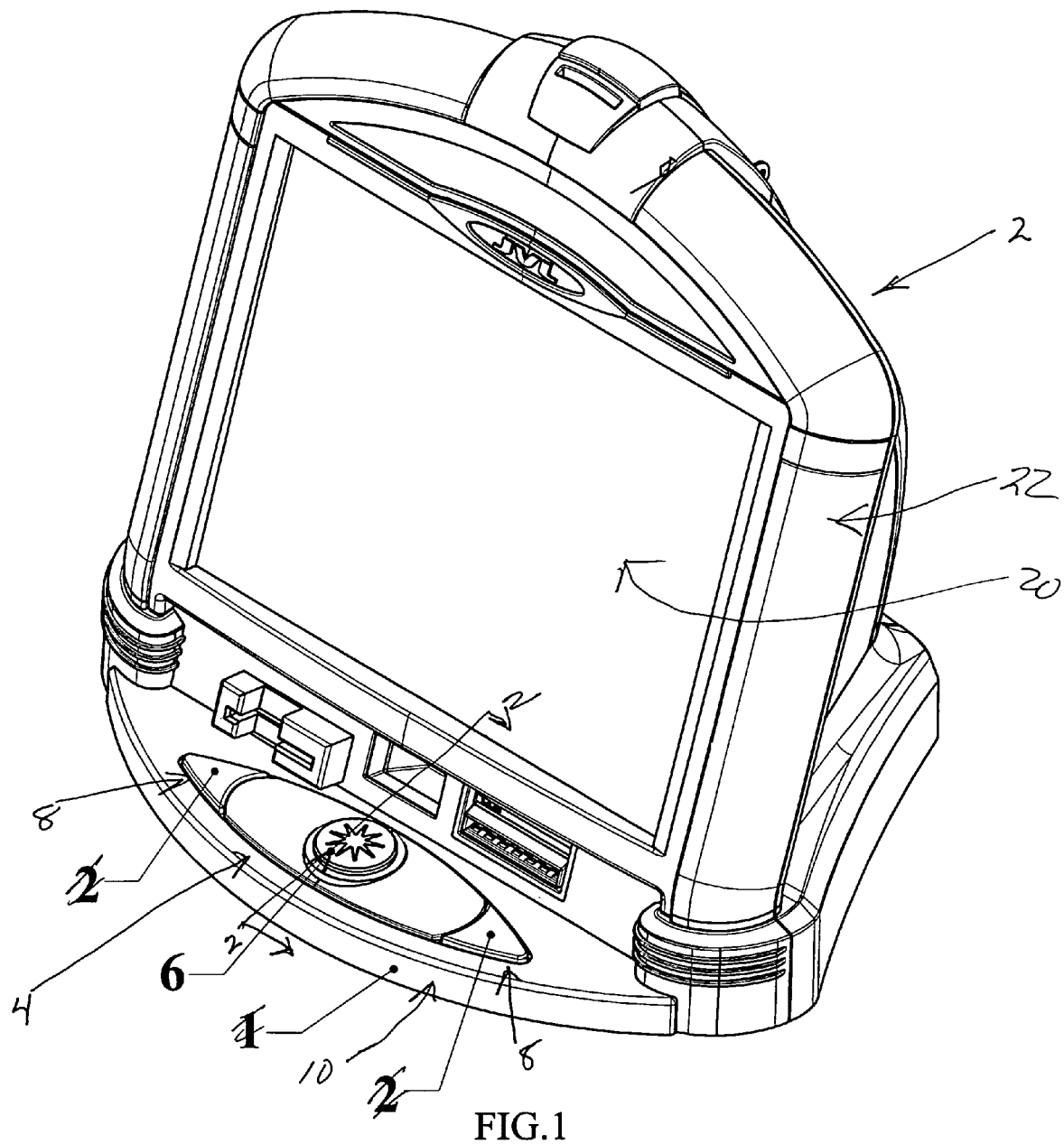
FIG. 1 is a front perspective view of the video game terminal with the particular control arrangement.

The video game terminal 2 shown in FIG. 1 includes a control actuating arrangement 4 provided at the front of the terminal and at a base position. The particular video game terminal shown is for a counter top application although this control arrangement is suitable for upright video game terminals.

The control actuating arrangement 4 includes a central player actuator control assembly 6 which is movable laterally through 360 degree movement. The control actuating arrangement 4 preferably includes left and right button actuators 8 positioned to opposite sides of the player actuator control assembly 6. The player actuator control assembly 6 and the button actuators are secured in the cover 10 for the control actuating arrangement. This will be further described in relation to FIGS. 10 through 12.

Figure 2:
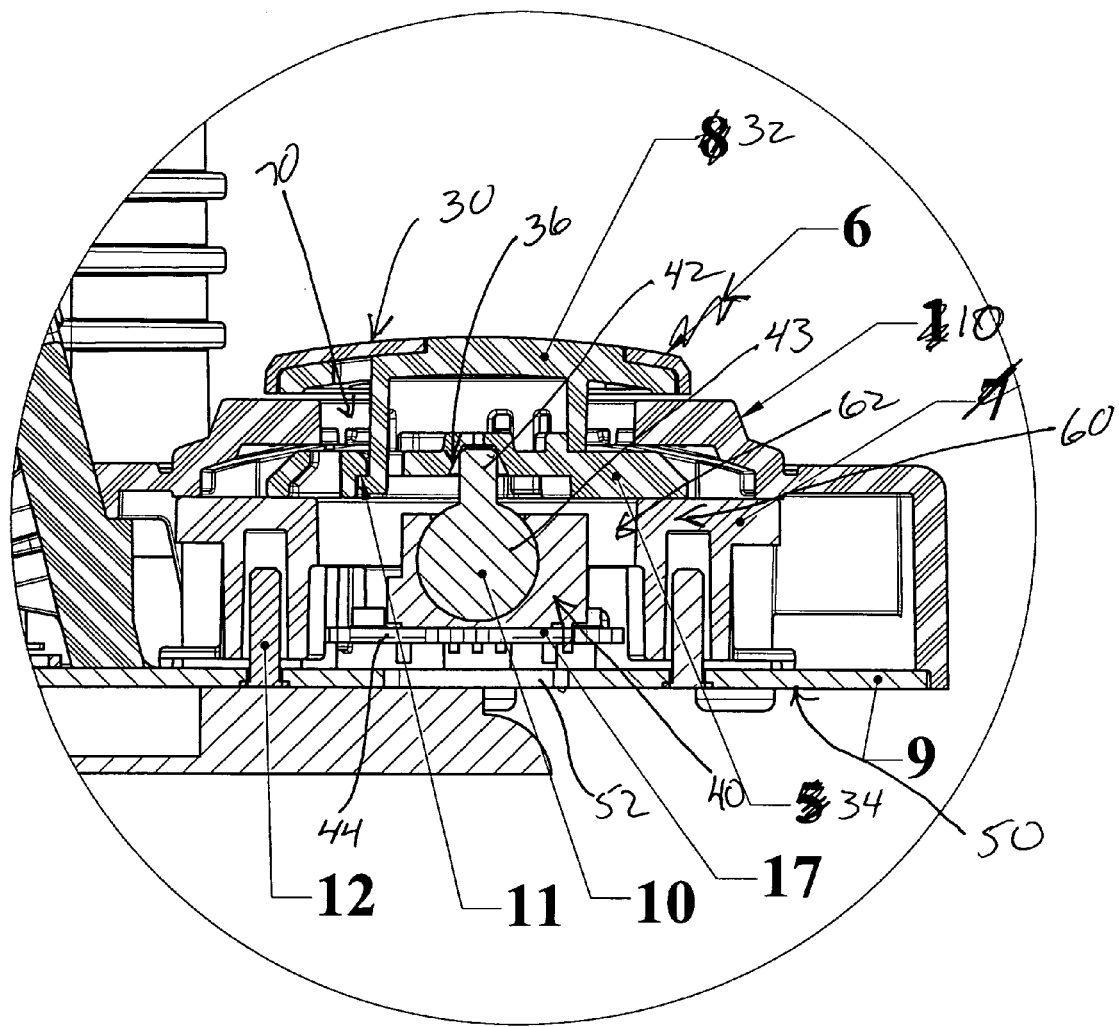
FIG. 2 is a partial cross sectional view taken along line 2.2 of FIG. 1.
Figure 3:
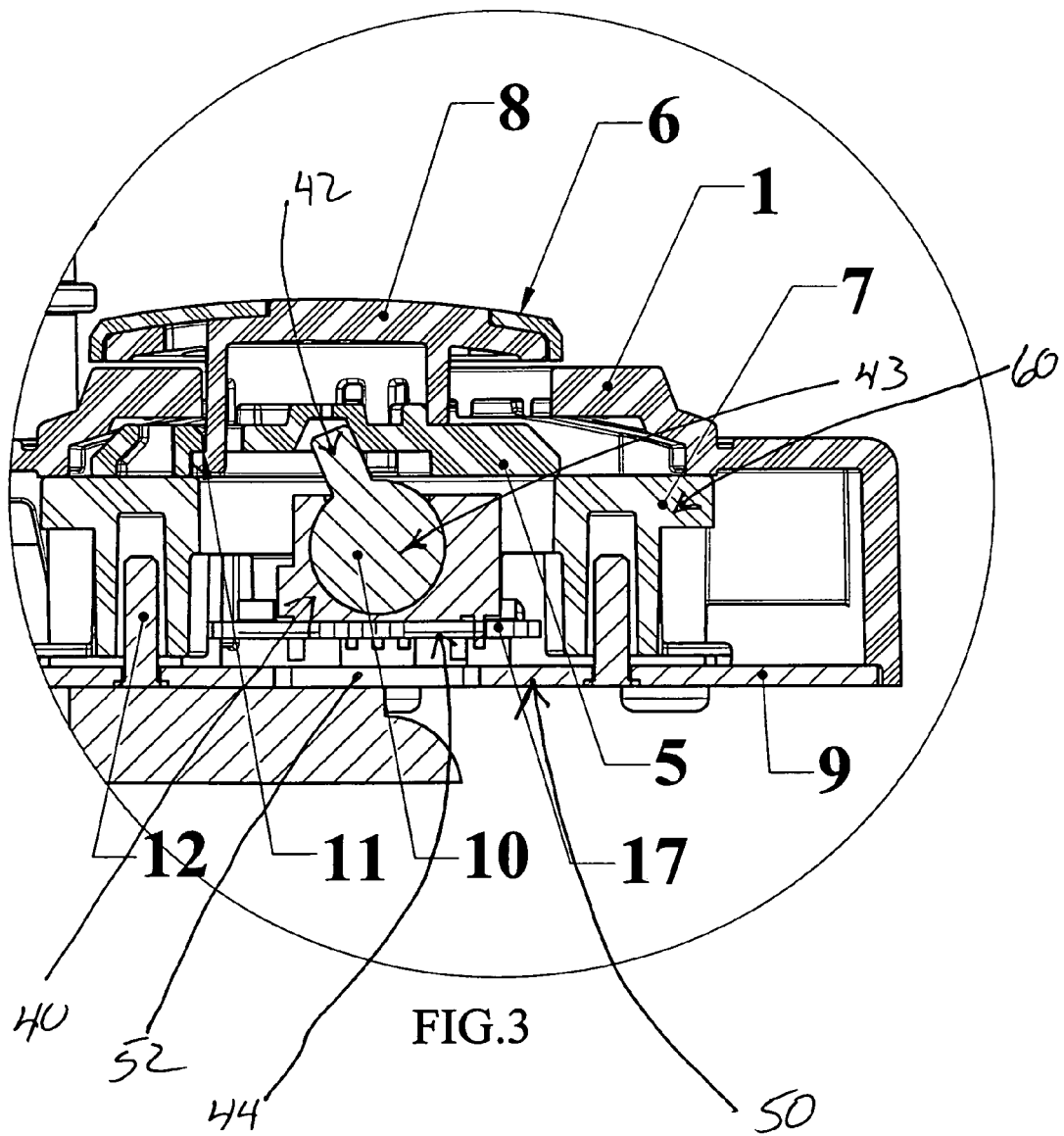
FIG. 3 is a cross sectional view similar to FIG. 2 with the joystick control in a different input position.
Figure 4:
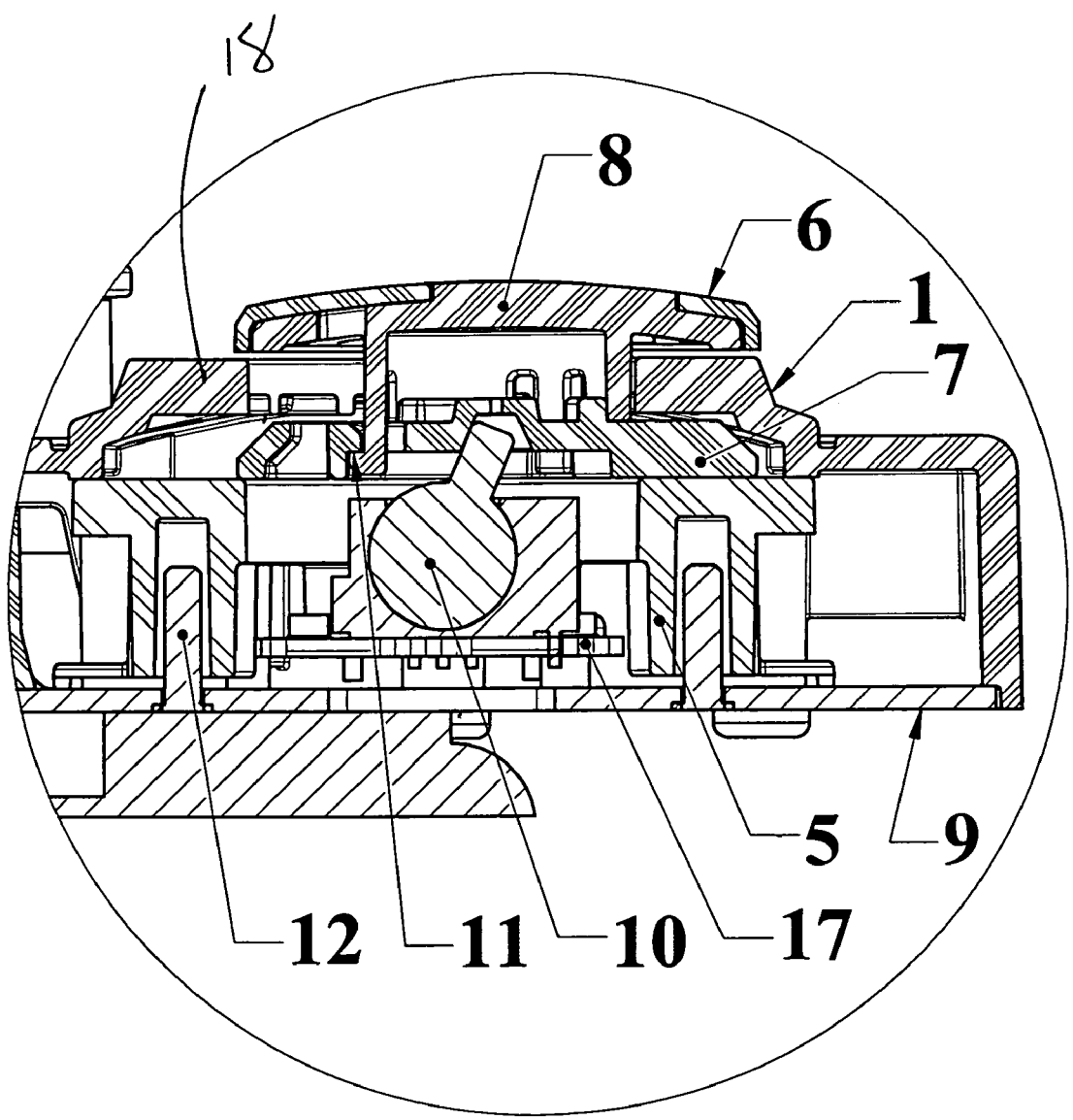
FIG. 4 is a view similar to FIG. 3 with a further different position of the joystick controller.
Figure 5A:
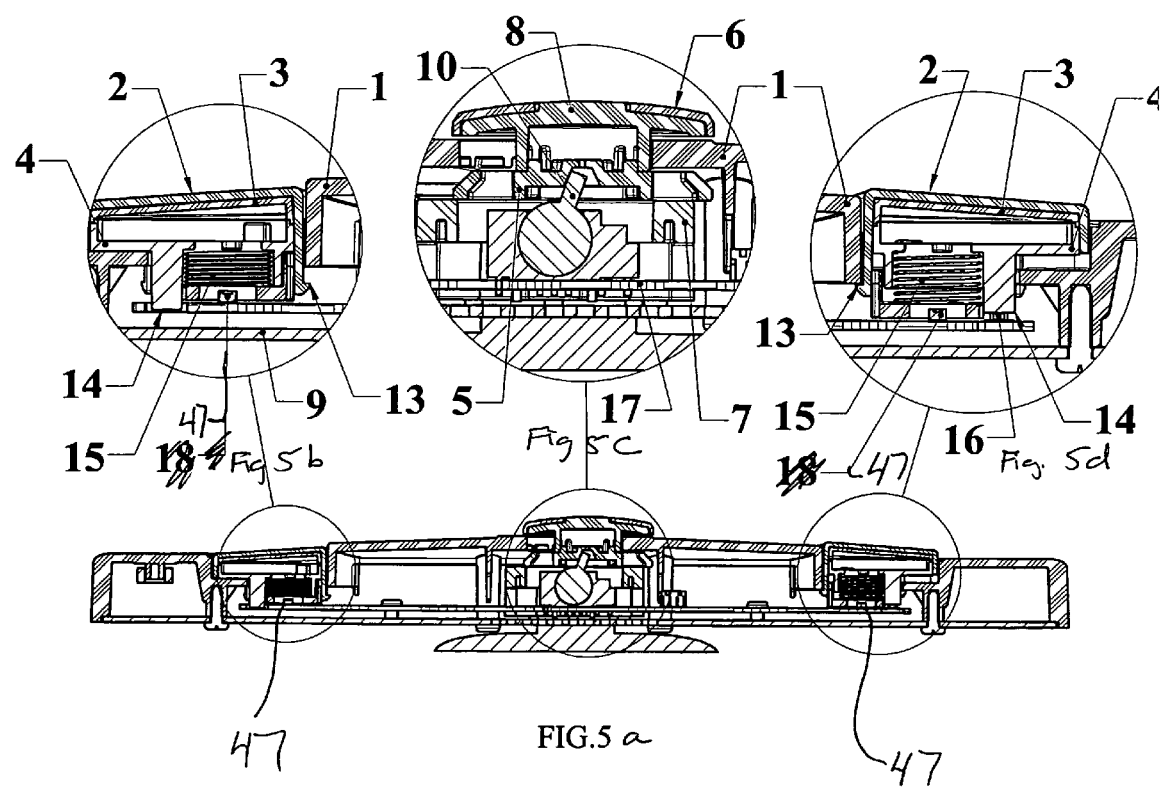
FIG. 5a is a cross sectional view through the control actuating arrangement.
Figure 6:
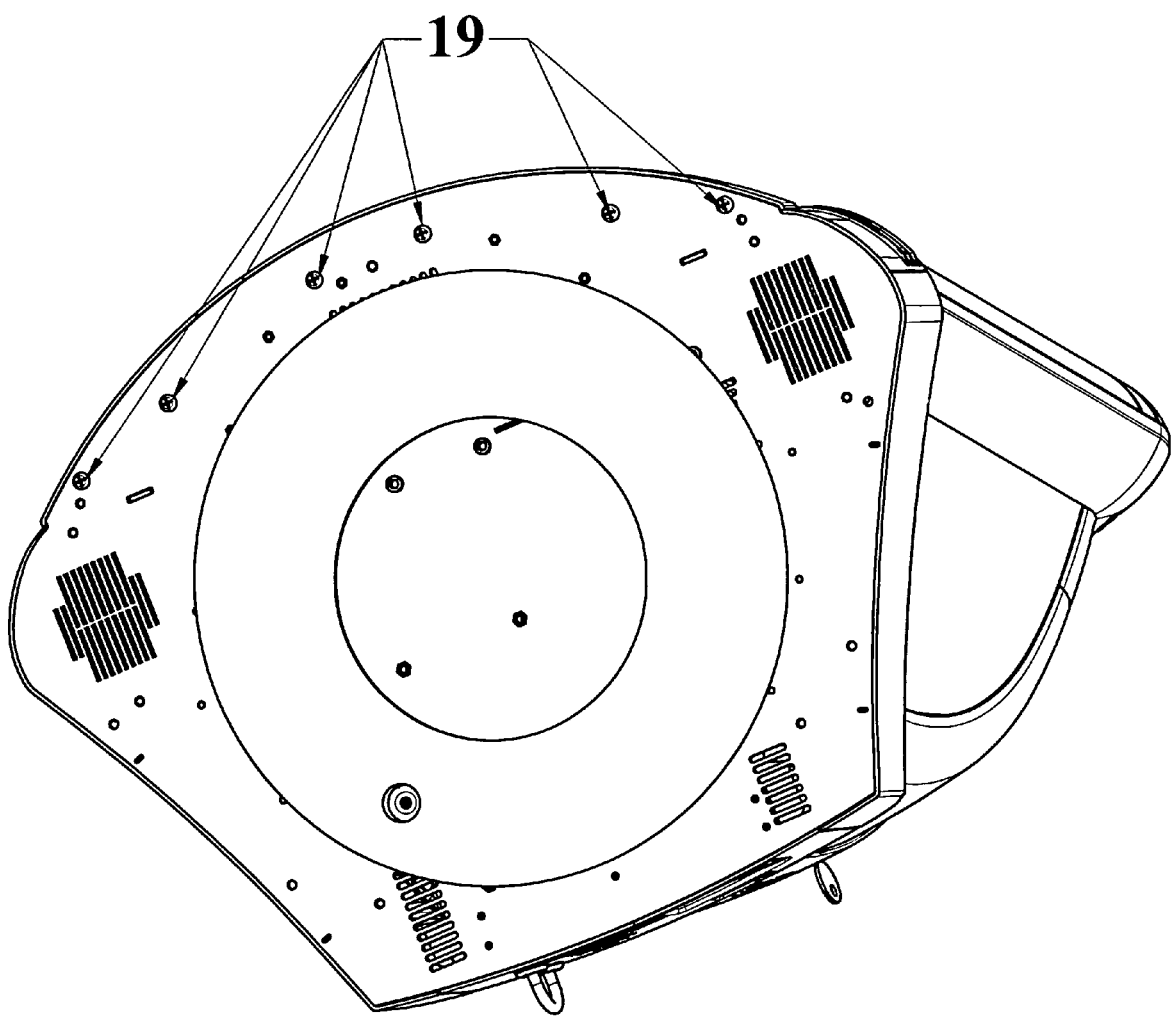
FIG. 6 is a bottom perspective view of the video game terminal.

FIGS. 2 through 4 are sectional views of the control actuating arrangement 4 taken along line 2-2 illustrating the joystick controller in different positions. The joystick controller 40 includes a short control shaft 42 rigidly connected to the ball actuator 43. A circuit board 44 is provided at a lower position and senses the position of the ball actuator 43. This joystick controller is a miniature joystick controller and is commonly available on the market. The miniature joystick controller is capable of more than 1,000,000 (one million) actuations and is based on resistive technology. This is the preferred type of joystick controller but other miniature joystick controllers could also be used.

The circuit board 44 of the joystick controller 40 is mounted in a raised position above the bottom support plate 50. This bottom support plate also includes a series of drain and air ventilation slots 52 to allow any liquid to pass through the base plate. These drain slots are provided adjacent the joystick controller and underneath the joystick controller. The joystick controller is fixed to the bottom support plate 50 and the short control shaft 42 extends upwardly into a joystick receiving recess 36 of the player actuator control assembly 6.

The player actuator control assembly 6 includes a top member 30 having a full insert 32 in the center of the top member and exposed within the top surface of the player actuator control assembly. This insert includes a series of downwardly extending lock legs 33 which engage via a snap fit with the bottom member 34. With this arrangement, the top member 30 is provided to the upper side of the cover 10 and the bottom member is provided below the cover 10. The player actuator control assembly 6 is free to move within the oversized recess 70 provided in the top cover 10. This allows the player actuator control assembly 6 to move laterally within the oversized recess while the player actuator control assembly is effectively trapped on the cover 10.

FIG. 2 also shows the support collar 60 having a large center recess 62 of a size to allow the joystick controller 40 to be located in this recess. The support collar 60 cooperates with the top cover 10 and the bottom member 34 of the player actuator 6 to support the player actuator 6 such that any substantial downward abusive force on the player actuator 6 is carried by the player actuator 6 and the collar 60, as opposed to being carried by the joystick controller 40. In the preferred embodiment, the player actuator 6 can exert some downward force on the joystick controller 40 to allow the player actuator control assembly 6 to also act as a button actuator.

Preferably, the joystick controller 40 also includes a light source which emits light upwardly through the player actuator control assembly 6 when the control actuator is activated for a particular game.

FIGS. 3 and 4 demonstrate different positions of the joystick controller as the player actuator control assembly 6 is moved.

FIG. 2 illustrates the player actuator control member in a central position, whereas FIG. 3 shows the player actuator control assembly moved to an extreme position closer to the base of the touch screen, whereas FIG. 4 shows the player actuator control assembly 6 moved to an extreme position away from the touch screen.

As can be seen, the control cover 10 and the bottom member 34 cooperate with the collar 60 to positively support the player actuator control assembly 6.

Furthermore, it can be seen from reviewing FIGS. 2 through 4 that the joystick receiving recess 36 is somewhat oversized such that lateral movement of the player actuator control assembly 6 affects pivoting of the control shaft 42 without tilting of the player actuator control assembly 6. This particular action has been found to be more natural for a player where the effective movement of the player actuator control assembly 6 is generally in one plane and is not appreciably affected by any tilting.

The upper surface of the player actuator control assembly 6 is of size to comfortably receive at least two fingers of a player in a side by side relationship on the upper surface. Preferably, the top surface of the player actuator control assembly 6 is about two inches in diameter. A player will typically have two or three fingers on the player actuator control assembly 6 and move his hand and arm in controlling the position of the player actuator control assembly 6. This type of action is more natural and does not require separate movement of the fingers or wrist of the player.

Figure 10:
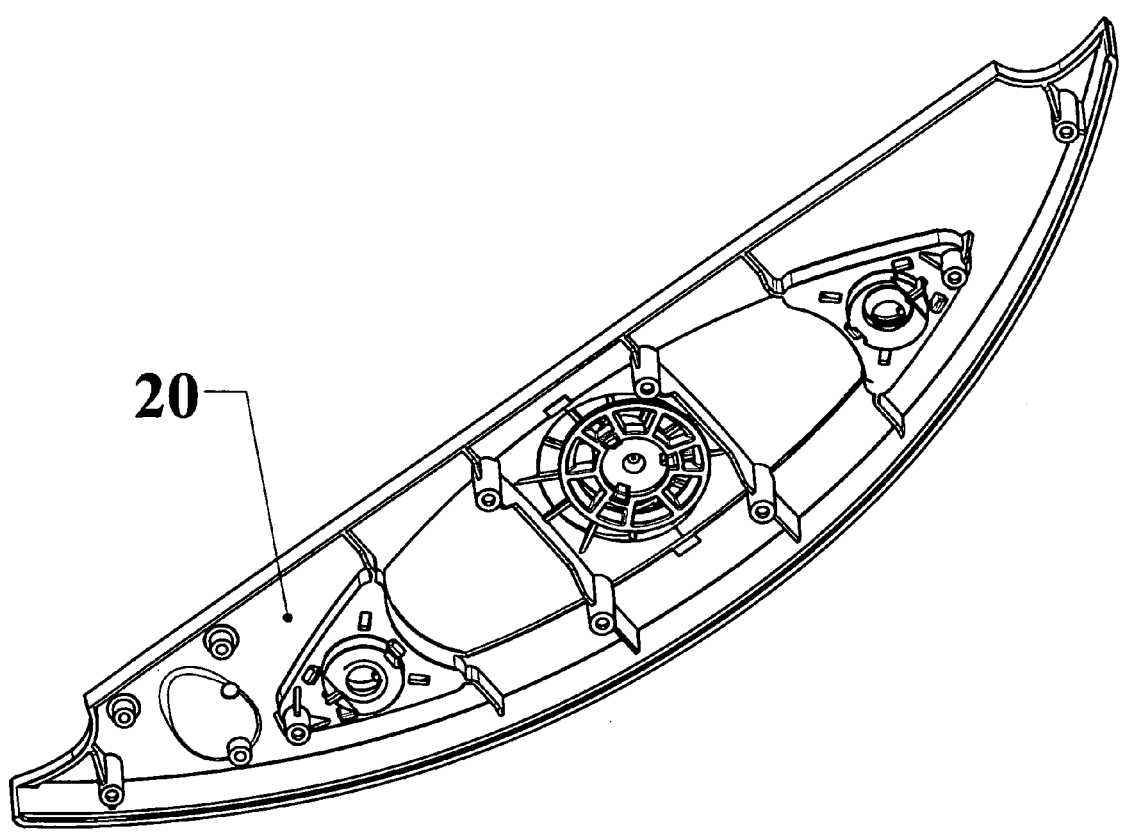
FIG. 10 is a bottom perspective view of a cover assembly that includes the player actuator control member.
Figure 11:
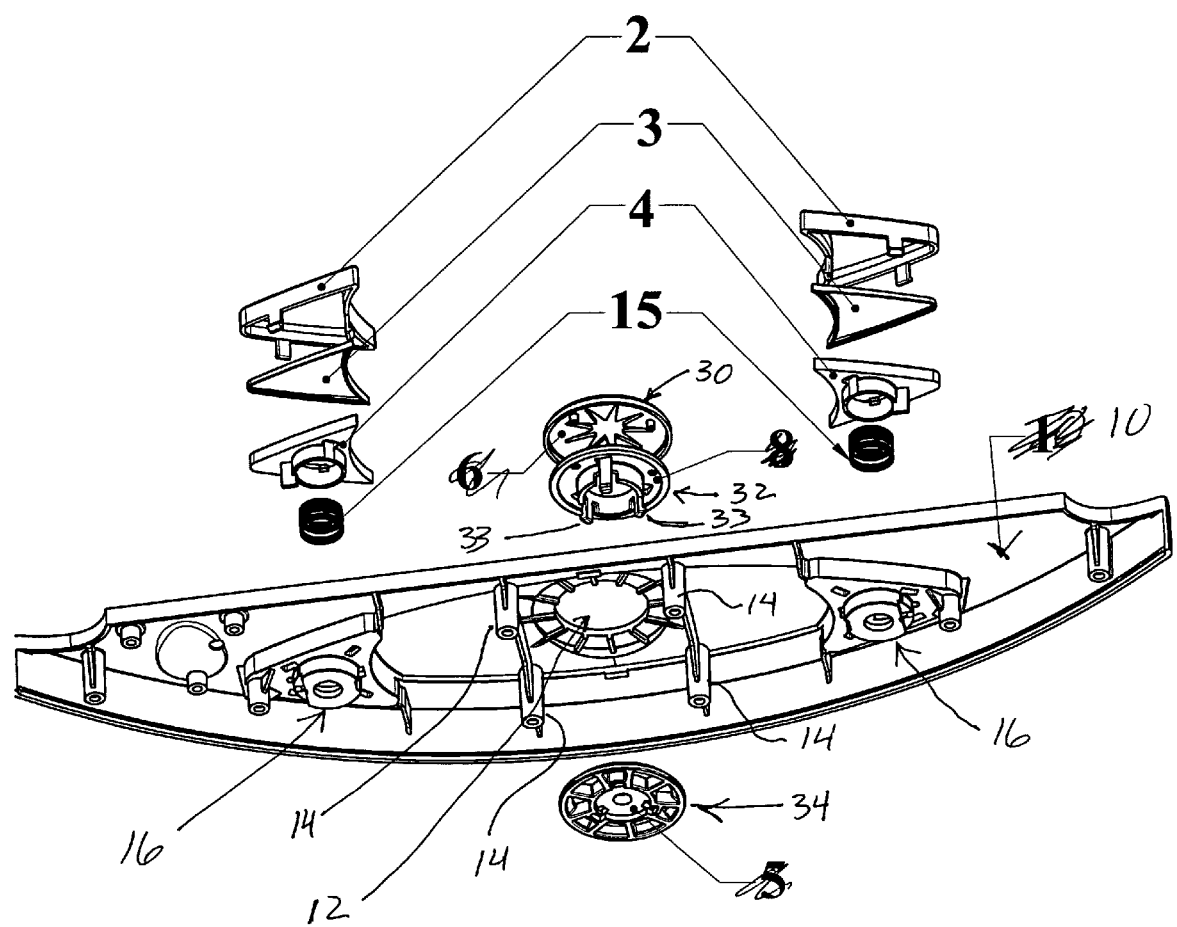
FIG. 11 is an exploded perspective view showing the various actuators secured in the cover of the control actuating arrangement.
Figure 12:
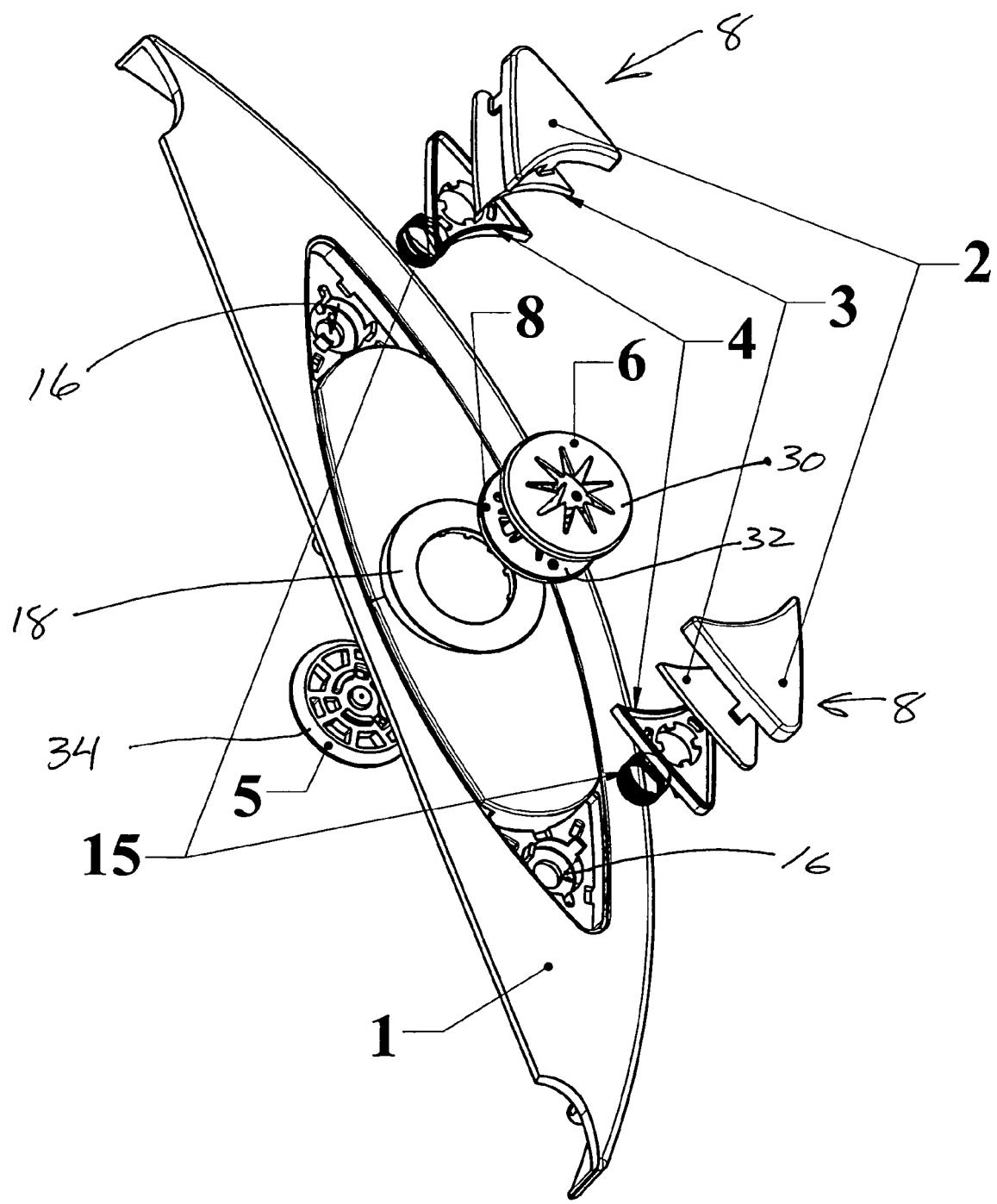
FIG. 12 is an exploded top perspective view of the player actuator control being secured in the cover for the control actuator arrangement.

As shown in FIGS. 10 through 12, the cover member 10 receives the player actuator control assembly 6 as part of an assembly of the cover 10 and similarly, the button actuators 8 are also received and maintained in this assembly. Each of the button actuators 8 are received in button actuator pockets 16 of the cover 10 and are spring loaded. The assembled cover 10 for the control actuating arrangement 4 is shown in FIG. 10.

Figure 7:
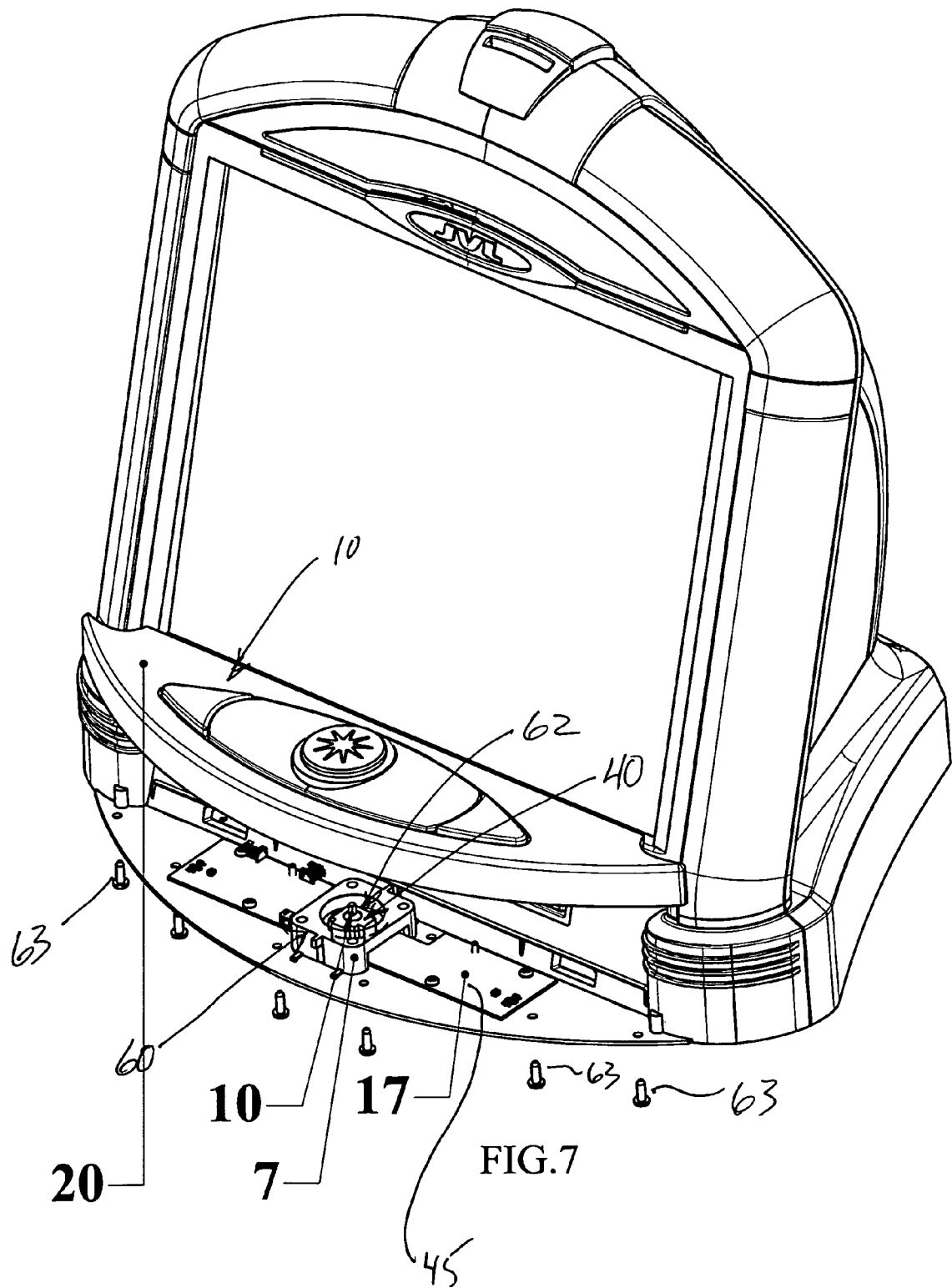
FIG. 7 is a partial exploded perspective view of the video game terminal showing different elements of the control actuating arrangement.
Figure 8:
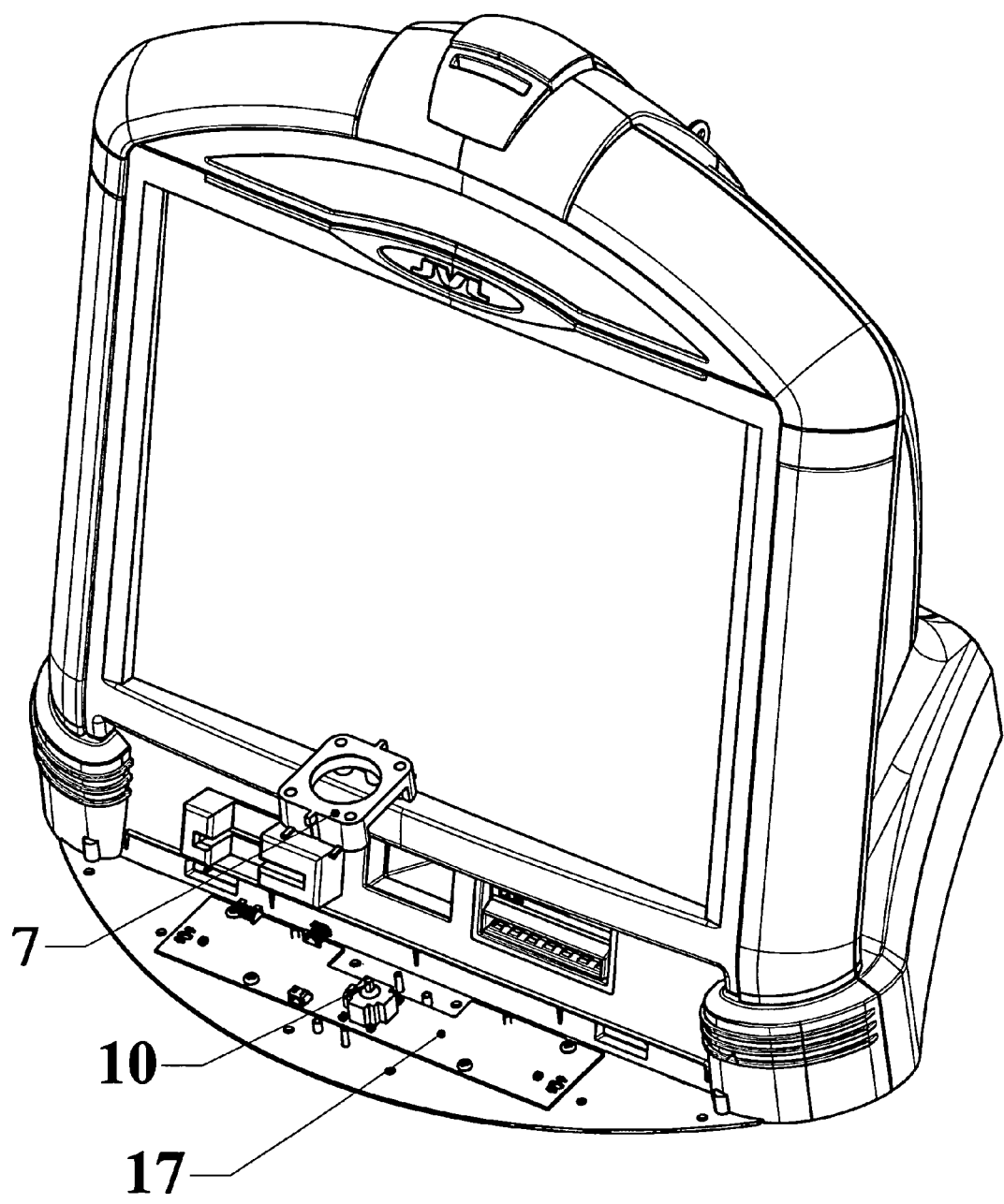
FIG. 8 is a partial exploded view of certain components of the control actuating arrangement.
Figure 9:
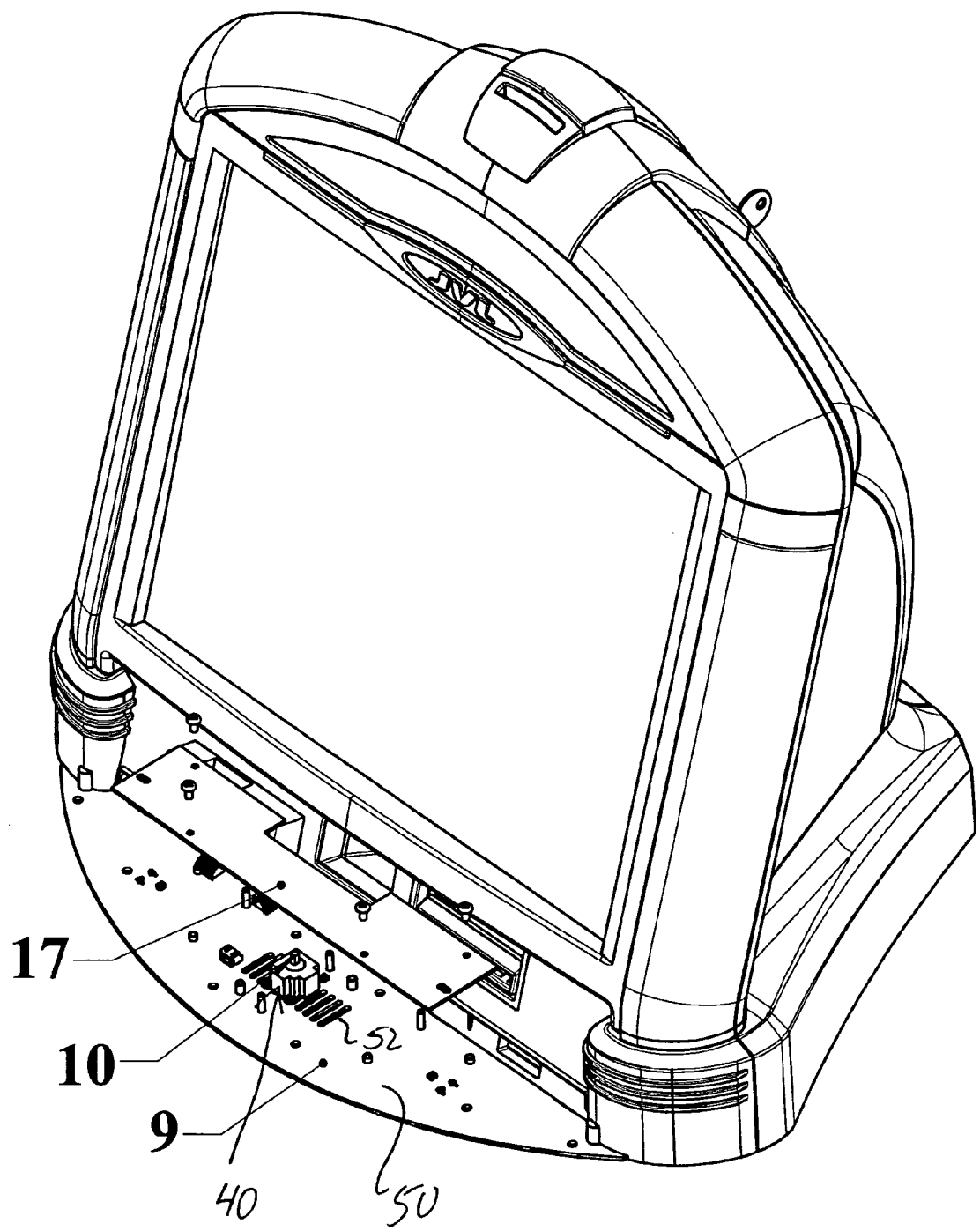
FIG. 9 is a perspective view of the video game terminal with the joy stick control mounted on a base member.

FIG. 7 illustrates securement of the cover assembly 10 above the joystick controller 40. The joystick controller is mounted on the printed circuit board 45 and this printed circuit board 45 cooperate with the button actuators 8. The circuit board 45 as shown in the cross sectional views is at a raised position and is above the drain holes 52 shown in FIG. 9. The support collar 60 straddles the circuit board 45 and has the joystick controller 40 exposed within the large center port 62. The cover assembly 10 can then be combined with the bottom support plate 50 and attached thereto by means of a series of screws or fasteners 63.

Each of the button actuators includes a switch arrangement for completing a circuit with the circuit board 45 and preferably, this circuit board 45 also includes an LED 47 associated with each button actuator 8. When the device is activated, for use with that particular game, these LED's are on and light is transmitted through the button actuators. The button actuators preferably include a translucent portion to allow the light to pass therethrough. This provides a further visual enhancement of the control actuating arrangement.

This particular arrangement has proven to be effective in both the assembly of the video game terminal and the durability of the video game terminal. Any liquid which is poured on the player actuator control assembly 6 is directed away from the joystick controller. As shown in the sectional view of FIG. 4, the cover 10 includes a raised support surface 18 that serves to support the actuator control assembly 6 while also directing any poured liquid to flow off of the cover member 10. Any liquid which passes through the oversized recess 70 in the cover member will strike the bottom member 34 and be directed outwardly of the joystick controller 40. Furthermore, the raised position of the circuit board 45 and the drain holes provided about the joystick controller allow any liquid that enters through the cover to pass out the base of the video game terminal. Thus, the arrangement provides effective support and protects the joystick controller 40 and also serves to protect the joystick controller from liquid damage caused accidentally or deliberately.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In a video game terminal a control actuating arrangement comprising a miniature joystick controller mounted on a support member;

a support collar mounted on said support member with a shaft actuator of said joystick controller exposed within said collar;

a player actuator control assembly supported by said collar above said joystick controller and engaging an end of a control shaft of said joystick controller and causing pivoting movement of said control shaft in response to lateral movement of said player actuator control assembly; and wherein said player actuator control assembly is movable laterally through 360 degrees to enter player commands to said joy stick controller.

2. In a video game terminal as claimed in claim 1 wherein said player actuator control assembly includes a top surface sized to receive in a side by side manner two or more fingers of a player to effect player input to said joystick controller via lateral movement of said player actuator control assembly.

3. In a video game terminal as claimed in claim 2 wherein said player actuator control assembly is oversized relative to said joystick controller and protects said joystick controller from abusive forces.

4. In a video game terminal as claimed in claim 3 wherein said player actuator control assembly covers said joystick controller and directs any liquid poured on said player actuator control assembly past said joystick controller.

5. In a video game terminal as claimed in claim 3 wherein said joystick controller includes a button actuator controlled by downward movement of said control shaft and said player actuator control assembly accommodates limited downward movement thereof to actuate said button actuator of said joystick controller.

6. In a video game terminal as claimed in claim 1 wherein said joystick controller includes an upwardly directed light source and said player actuator includes a translucent portion through which emitted light of said light source is transmitted.

7. In a video game terminal as claimed in claim 6 wherein said light source is actuated for any games where said control actuating arrangement is activated.

* * * * *